Sept. 14, 1954  A. KAUFMANN  2,689,310
ELECTRIC STARTING MOTOR FOR INTERNAL-COMBUSTION ENGINES
Filed March 25, 1953
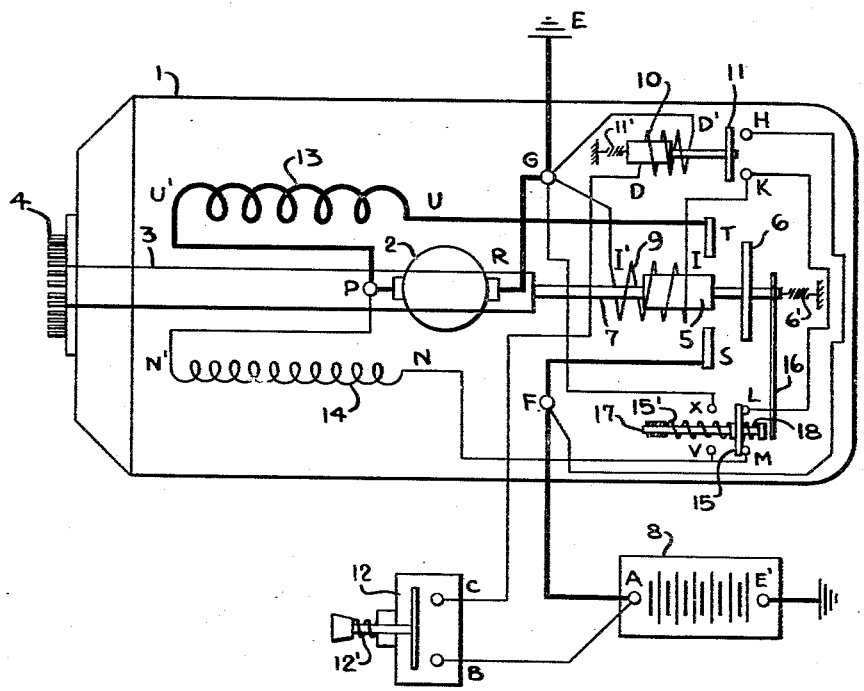
INVENTOR.
ALBERT KAUFMAN
BY Patented Sept. 14, 1954

2,689,310

UNITED STATES PATENT OFFICE 2,689,310

ELECTRIC STARTING MOTOR FOR INTERNAL-COMBUSTION ENGINES

Albert Kaufmann, Zuchwil, Switzerland, assignor to Scintilla Ltd., Soleure, Switzerland Application March 25, 1953, Serial No. 344,556

15 Claims. (Cl. 290—38)

1

This invention relates to electrical starting motors for internal combustion engines. Such motors are normally provided with a pinion on the motor armature shaft adapted when the motor is energized to be moved axially into mesh with a toothed annulus on the circumference of the engine clutch or flywheel or other member secured to the engine crankshaft.

In such starting motors the main requirement is to effect a satisfactory and reliable engagement of the pinion with the toothed annulus and to reduce to a minimum the arcing and consequent burning of the electric contacts of the motor switch so that the motor will operate without trouble for long periods of use. The compact construction of the internal combustion engine mounting in automobiles limits the space available for the starting motor, the switching arrangement and wiring provided with such switching arrangement.

Satisfactory and reliable engagement of the pinion of such starting motors can be achieved without damage to the teeth if, in the initial operation of the starting motor, the pinion is moved towards the annulus while rotating at a low speed and with a low torque in a direction opposite to the driving direction until the teeth mesh and, thereafter, in the actual starting operation, the complete torque is developed in the correct direction for starting the engine. Burning of the contacts is avoided by a momentary reduction of the inductance of the field winding of the motor at the instant when the motor operating current is switched off, whereby sparking at the contacts is substantially suppressed.

The object of the present invention is to provide an electric starting motor for internal combustion engines which will engage the annulus smoothly while at the same time reducing sparking at the electric contacts, and the resultant burning of the contacts to a minimum.

With the above object in view, the present invention mainly consists of an electric starting motor comprising, in combination, rotatable shaft means, an armature mounted on the shaft means rotatable together with the same, a main field winding for exciting said armature and rotating the same in one direction, a secondary field winding exciting the armature and rotating the same in an opposite direction, a source of current, manually operable means for connecting the secondary field winding to the source of current in a preliminary stage of operation so that the current from the current source flows through the secondary field winding in an opposite direction to that which the current flows in an operative stage,

2 automatic connecting means for automatically connecting the main field winding to the source of current a short time interval after the secondary field winding has been connected to the source of current, and means for automatically interrupting the opposite flow of current from the current source through the secondary field winding shortly before the automatic connecting means connects the main field winding to the source of current, and thereafter, subsequent to the connection of the main field winding to the source of current, automatically connecting the secondary field winding in parallel with the main field winding, the current from the current source flowing through the main and the secondary field windings in the same direction.

To enable the invention to be more fully understood it will now be described with reference to the accompanying drawing which shows schematically an electric starting motor according to the present invention.

Referring to the drawing, 1 designates the outlines of the starting motor. The armature 2 has a longitudinal bore of known construction in which is mounted a displaceable shaft 3 having the driving pinion 4 secured to the end thereof. The feed movement of the shaft 3 with the pinion 4 towards the toothed annulus (not shown) is produced by means of a magnetically energized coil core 5, of an electromagnetic main current switch 6 through a push rod 7. The main current switch is urged in the open position, wherein contacts T, S, are not bridged, by spring 6' when the coil 9 is not energized.

The operating current of the motor is derived from a battery 8, one terminal E' of which is earthed in the present example. However, an insulated return may be employed if desired.

The switch 6 has a solenoid coil 9 surrounding the core 5 and the feed line of the coil 9 leads across the contacts of a relay switch 11 which is thrown in and out of circuit by a control switch 12; the switch 12 is preferably arranged on the control panel of the automobile but it may be in any other position which is accessible to the driver of the automobile. Switches 11 and 12 are provided with springs 11' and 12' respectively which urge these switches into the open position when not actuated.

The starting motor itself comprises a field winding 13 and a secondary field winding 14. The latter is connected to a change-over switch 15 by which it is energized to effect the following three different functions in succession during the operation of the starting motor:

(1) In the preliminary stage of the starting operation, the secondary field winding 14 is traversed by a current which flows in a direction opposite to the normal direction of current flow when starting the engine, and generates a weak field which produces a backward rotation of the armature 2 and of the pinion 4 at a low speed and with a low torque, while at the same time the pinion is urged axially to engage the toothed annulus on the flywheel of the internal combustion engine.

(2) At the instant when the teeth of the pinion meet and begin to mesh with the corresponding tooth gaps in the toothed annulus, the direction of the current in the secondary field winding changes, so that the secondary field winding operates in parallel with the field winding 13 during the next stage of the operation of the starting motor.

(3) Finally the secondary field winding is short-circuited when the main current switch 6 is opened and thus has a suppressing action on the sparking at the contacts.

These three functions of the secondary field winding 14 are effected by operation of the main current switch 6 in conjunction with a mechanically operated change-over switch 15 which is automatically controlled by the action of the main current switch. For this purpose the end of a pressure finger 16, connected to the coil core 5, bears against the extended end of a guide rod 17 of the change-over switch 15 when the coil core 5 is energized. In order that the switch 15 may effectively break the secondary field winding circuit before the switch 6 closes the main circuit, the travel of the switch 6 is made at least substantially twice as great as the travel of the pressure finger 16 to the end of the guide rod 17. The contact bridge of the switch 15 is loosely connected to the end of the rod 17, adjacent to the contact bridge, and is pressed by a pressure spring 18 against a shoulder on the rod. Thus, the spring 18 is compressed when the switch 6 through the pressure finger 16 has forced the change-over switch 15 into its second position in which the contacts L and M are open and the contacts X and V are closed; thus when the switch 6 is opened, the change-over switch remains in the second position until the pressure spring 18 has expanded again so that the connection of the contacts X and V cannot be broken before the switch 6 is open. The change-over switch 15 is urged into the position, wherein contacts L, M are bridged, by spring 15' when switch 6 is opened. The starting motor operates as follows:

On operation of the control switch 12, current flows from the battery 8 through the circuit A—B—C—D—D'—G—E back to the second battery terminal, the coil 10 of the relay switch 11 thus being energized, and the contacts H—K bridged. At the same time current flows through the circuit A—F—H—K—L—M—N—N'—P—R—G—E and energizes the secondary field winding 14 in the opposite direction to the normal engine starting direction, whereby the armature 2 and the pinion 4 are turned in the backward direction at a low speed and with a low torque.

At the same time current flows in parallel with the above circuits from the terminal K through I—I'—G—E and thus energizes the coil 9 of the main current switch 6. The core 5 is then attracted and exerts an axial pressure on the shaft 3 through the push rod 7, whereby the pinion 4 is moved axially to engage the toothed annulus of the internal combustion engine. Until the teeth of the pinion 4 meet and begin to mesh with the corresponding tooth gaps in the toothed annulus the switch 6 cannot close the main circuit. This is insured by spacing the bridging contact of switch 6 from contacts T, S in such manner that the switch 6 cannot close the circuit to the main field winding 13 until the teeth of the pinion 4 begin to mesh with the toothed gaps in the toothed annulus. However, when they do mesh the following takes place due to the initial backward movement of the pinion which generally takes only a fraction of a second.

The switch 6 is completely attracted, but before it reaches and closes the counter contacts S and T, the pressure finger 16 operates the switch 15 to break the contacts L—M and interrupts the current flowing from N to N' in the secondary field winding 14. Immediately after this, the switch connects the two opposite contacts V—X, and the two contacts S—T are then bridged by the main current switch 6. At this instant, the two field windings 13, 14 and the armature 2 are simultaneously energized, the field winding 13 lying in the circuit A—F—S—T—U—U'—P—R—G—E, while the secondary field winding 14 lies in the parallel circuit P—N'—N—V—X—G—E, the two field windings acting in the same sense. This is the normal operational condition of the starting motor, which is maintained until the internal combustion engine starts and commences to run.

The control switch 12 is released when the engine is running. The two coils 10 and 9 are then de-energized, the main current through the field winding 13 being interrupted. If no special protective measures were taken, the breaking sparks produced at the switch contacts S and T by the induction shock set up in the field coil 13 at the moment when the current is swtiched off would cause considerable burning of the contacts and their life would necessarily be considerably shortened. This is prevented by maintaining the switch 15 in the closed position, in which the contacts V—X are bridged, until the main current switch 6 has been switched off, at which time the secondary field winding 14 is de-energized and is short-circuited in itself through the points G—R—P—N'—N—V—X—G. Owing to the magnetic coupling of the short-circuited secondary field winding 14 with the field winding 13, the inductance of the field winding 13 is considerably reduced in the operational position described, whereby sparking at the contacts S and T is reduced to a minimum.

With a view to affording reliable functioning and cooperation of all the aforesaid parts and in order to simplify fitting the starting motors to internal combustion engines, the controlling members above described are housed in a closed space in the starting motor housing. Consequently, the diameter of the housing for the members must not be greater than the diameter of the starting motor housing. The control switch 12 is installed outside the starting motor housing in some convenient position within reach of the driving seat of the automobile or other suitable position.

I claim:

1. An electric starting motor for internal combustion engines comprising, in combination, rotatable shaft means; an armature mounted on said shaft means rotatable together with the same; a main field winding for exciting said armature and rotating the same in one direction; a secondary field winding for exciting said armature and rotating the same in opposite direction;

electric circuit means including a source of current; operating switch means connected to said electrical circuit means for closing and opening the same; a main switch arranged between said main field winding and said electric circuit means and movable between closed and open positions so as to connect and disconnect, respectively, said main field winding and said electric circuit means; a secondary switch arranged between said electric circuit means and said secondary field winding and movable between open and closed positions for connecting and disconnecting, respectively, said secondary field winding and said electric circuit means; means permanently urging said secondary switch into said closed position thereof and to hold it in such position; electric operating means for automatically moving said main switch into said closed position thereof a short time after said operating switch means has been closed; and means for automatically moving said secondary switch means into open position when said main switch means is moved into closed position.

2. An electric starting motor for internal combustion engines comprising, in combination, rotatable shaft means; an armature mounted on said shaft means rotatable together with the same; a main field winding for exciting said armature and rotating the same in one direction; a secondary field winding exciting said armature and rotating the same in an opposite direction; a source of current; manually operable means for connecting said secondary field winding to said source of current, whenever desired; automatic connecting means for automatically connecting said main field winding to said source of current a short time interval after said secondary winding has been connected to said source of current; and means for automatically disconnecting said secondary field winding from said source of current when said main field winding is connected thereto.

3. An electric starting motor for internal combustion engines comprising, in combination, rotatable shaft means; an armature mounted on said shaft means rotatable together with the same; a main field winding for exciting said armature and rotating the same in one direction; a secondary field winding exciting said armature and rotating the same in an opposite direction; a source of current; manually operable means for connecting said secondary field winding to said source of current, whenever desired; automatic connecting means electrically connected to said manually operable means, said automatic connecting means automatically connecting said main field winding to said source of current a short time interval after said secondary winding has been connected to said source of current; and means for automatically disconnecting said secondary field winding from said source of current when said main field winding is connected thereto.

4. An electric starting motor for internal combustion engines comprising, in combination, rotatable shaft means; an armature mounted on said shaft means rotatable together with the same; a main field winding for exciting said armature and rotating the same in one direction; a secondary field winding exciting said armature and rotating the same in an opposite direction; a source of current; manually operable means for connecting said secondary field winding to said source of current, whenever desired; automatic connecting means for automatically connecting said main field winding to said source of current a short time interval after said secondary winding has been connected to said source of current; and means cooperatively connected to said automatic connecting means for automatically disconnecting said secondary field winding from said source of current when said main field winding is connected thereto.

5. An electric starting motor for internal combustion engines comprising, in combination, rotatable shaft means; an armature mounted on said shaft means rotatable together with the same; a main field winding for exciting said armature and rotating the same in one direction; a secondary field winding exciting said armature and rotating the same in an opposite direction; a source of current; manually operable means for connecting said secondary field winding to said source of current, whenever desired; automatic connecting means for automatically connecting said main field winding to said source of current a short time interval after said secondary winding has been connected to said source of current; and means cooperatively connected to said automatic connecting means for automatically disconnecting said secondary field winding from said source of current when said main field winding is connected thereto.

6. An electric starting motor for internal combustion engines comprising, in combination, rotatable shaft means; an armature mounted on said shaft means rotatable together with the same; a main field winding for exciting said armature and rotating the same in one direction; a secondary field winding exciting said armature and rotating the same in an opposite direction; electric circuit means; a manually operable switch for connecting said secondary field winding to said source of current, whenever desired; a relay for automatically connecting said main field winding to said source of current a short time interval after said secondary winding has been connected to said source of current; and means for automatically disconnecting said secondary field winding from said source of current when said main field winding is connected to said source of current.

7. An electric starting motor for internal combustion engines comprising, in combination, rotatable shaft means; an armature mounted on said shaft means rotatable together with the same; a main field winding for exciting said armature and rotating the same in one direction; a secondary field winding exciting said armature and rotating the same in an opposite direction; a source of current; means for connecting said secondary field winding to said source of current in a preliminary stage of operation so that the current from said current source flows through said secondary field winding in an opposite direction to that which said current flows in an operative stage; automatic connecting means for automatically connecting said main field winding to said source of current a short time interval after said secondary field winding has been connected to said source of current; and means for automatically interrupting the opposite flow of current from said current source through said secondary field winding shortly before said automatic connecting means connects said main field winding to said source of current, and thereafter, subsequent to the connection of said main field winding to said source of current, automatically connecting said secondary field winding in parallel with said main field winding, the current from said current source flowing through said main and said secondary field windings in the same direction.

8. An electric starting motor for internal combustion engines comprising, in combination, rotatable shaft means; an armature mounted on said shaft means rotatable together with the same; a main field winding for exciting said armature and rotating the same in one direction; a secondary field winding exciting said armature and rotating the same in an opposite direction; a source of current; a manually operable switch for connecting said secondary field winding to said source of current in a preliminary stage of operation so that the current from said source of current flows through said secondary field winding in an opposite direction to that which said current flows in an operative stage; a relay for automatically connecting said main field winding to said source of current a short time interval after said secondary field winding has been connected to said source of current; and means for automatically interrupting the opposite flow of current from said current source through said secondary field winding shortly before said relay connects said main field winding to said source of current, and thereafter, subsequent to the connection of said main field winding to said source of current, connecting said secondary field winding in parallel with said main field winding, the current from said current source flowing through said main and said secondary field windings in the same direction.

9. An electric starting motor for internal combustion engines comprising, in combination, rotatable shaft means; an armature mounted on said shaft means rotatable together with the same; a main field winding for exciting said armature and rotating the same in one direction; a secondary field winding exciting said armature and rotating the same in an opposite direction; a source of current; manually operable means for connecting said secondary field winding to said source of current in a preliminary stage of operation so that the current from said current source flows through said secondary field winding in an opposite direction to that which said current flows in an operative stage; a main switch arranged between said main field winding and said source of current and movable between closed and open positions so as to connect and disconnect, respectively, said main field winding and said source of current; means for automatically interrupting the opposite flow of current from said current source through said secondary field winding shortly before said automatic connecting means connects said main field winding to said source of current, and thereafter, subsequent to the connection of said main field winding to said source of current, automatically connecting said secondary field winding in parallel with said main field winding, the current from said current source flowing through said main and said secondary field windings in the same direction; and means for reducing arcing at the contacts of said main switch when said main switch is moved into the open position.

10. An electric starting motor for internal combustion engines comprising, in combination, rotatable shaft means; an armature mounted on said shaft means rotatable together with the same; a main field winding for exciting said armature and rotating the same in one direction; a secondary field winding for exciting said armature and rotating the same in opposite direction; electric circuit means including a source of current; operating switch means connected to said electrical circuit means for closing and opening the same; a main switch arranged between said main field winding and said electric circuit means and movable between closed and open positions so as to connect and disconnect, respectively, said main field winding and said electric circuit means; a secondary switch arranged between said electric circuit means and said secondary field winding and movable between open and closed positions for connecting and disconnecting, respectively, said secondary field winding and said electric circuit means; and synchronizing means for synchronizing the operation of said main switch and said secondary switch so that when one of said switches is in the open position, the other of said switches will be in a closed position.

11. An electric starting motor for internal combustion engines comprising, in combination, rotatable shaft means; an armature mounted on said shaft means rotatable together with the same; a main field winding for exciting said armature and rotating the same in one direction; a secondary field winding for exciting said armature and rotating the same in opposite direction; electric circuit means including a source of current; operating switch means connected to said electrical circuit means for closing and opening the same; manually operable means for connecting said secondary field winding to said electric circuit means whenever desired; a main switch arranged between said main field winding and said electric circuit means and movable between closed and open positions so as to connect and disconnect, respectively, said main field winding and said electric circuit means; and means for automatically disconnecting said secondary field winding from said electric circuit means when said main field winding is connected thereto.

12. An electric starting motor for internal combustion engines comprising, in combination, rotatable shaft means; an armature mounted on said shaft means rotatable together with the same; a main field winding for exciting said armature and rotating the same in one direction; a secondary field winding for exciting said armature and rotating the same in opposite direction; electric circuit means including a source of current; operating switch means connected to said electrical circuit means for closing and opening the same; manually operable means for connecting said secondary field winding to said electric circuit means whenever desired; a main switch arranged between said main field winding and said electric circuit means and movable between closed and open positions so as to connect and disconnect, respectively, said main field winding and said electric circuit means; a secondary switch arranged between said electric circuit means and said secondary field winding and movable between open and closed positions for connecting and disconnecting, respectively, said secondary field winding and said electric circuit means; and means for automatically moving said secondary switch into open position when said main switch is moved into closed position.

13. An electric starting motor for internal combustion engines comprising, in combination, rotatable shaft means; an armature mounted on said shaft means rotatable together with the same; a main field winding for exciting said armature and rotating the same in one direction; a secondary field winding for exciting said armature and rotating the same in opposite direction; electric circuit means including a source of current; operating switch means connected to said electrical circuit means for closing and opening the same; a main switch arranged between said main field winding and said electric circuit means and movable between closed and open positions so as to connect and disconnect, respectively, said main field winding and said electric circuit means, said main switch having a pressure finger cooperatively connected thereto; a secondary switch arranged between said electric circuit means and said secondary field winding and movable between open and closed positions for connecting and disconnecting, respectively, said secondary field winding and said electric circuit means, said secondary switch being operated by means of said pressure finger cooperatively connected to said main switch; means permanently urging said secondary switch into said closed position thereof and to hold it in such position; electric operating means for automatically moving said main switch into said closed position thereof a short time after said operating switch means has been closed; and means for automatically moving said secondary switch means into open position when said main switch means is moved into closed position.

14. An electric starting motor for internal combustion engines comprising, in combination, rotatable shaft means; an armature mounted on said shaft means rotatable together with the same; a main field winding for exciting said armature and rotating the same in one direction; a secondary field winding for exciting said armature and rotating the same in opposite direction; electric circuit means including a source of current; operating switch means connected to said electrical circuit means for closing and opening the same; a main switch arranged between said main field winding and said electric circuit means and movable between closed and open positions so as to connect and disconnect, respectively, said main field winding and said electric circuit means; a secondary switch arranged between said electric circuit means and said secondary field winding and movable between open and closed positions for connecting and disconnecting, respectively, said secondary field winding and said electric circuit means; electric operating means for automatically moving said main switch into said closed position thereof a short time after said operating switch means has been closed; and means for automatically moving said secondary switch means into open position when said main switch means is moved into closed position.

15. An electric starting motor for internal combustion engines comprising, in combination, rotatable shaft means; an armature mounted on said shaft means rotatable together with the same; a main field winding for exciting said armature and rotating the same in one direction; a secondary field winding exciting said armature and rotating the same in an opposite direction; a source of current; manually operable means for connecting said secondary field winding to said source of current in a preliminary stage of operation so that the current from said current source flows through said secondary field winding in an opposite direction to that which said current flows in an operative stage; a main switch arranged between said main field winding and said source of current and movable between closed and open positions so as to connect and disconnect, respectively, said main field winding and said source of current; means for automatically interrupting the opposite flow of current from said current source through said secondary field winding shortly before said automatic connecting means connects said main field winding to said source of current, and thereafter, subsequent to the connection of said main field winding to said source of current, automatically connecting said secondary field winding in parallel with said main field winding, the current from said current source flowing through said main and said secondary field windings in the same direction; and means for reducing arcing at the contacts of said main switch when said main switch is moved into the open position, the current from said current source flowing through said main and said secondary field windings in the same direction, said secondary field winding being short circuited after said main switch is moved into said open position, thereby preventing arcing at the contacts of said main switch.

References Cited in the file of this patent

UNITED STATES PATENTS

| Number | Name | Date |
| --- | --- | --- |
| 1,171,375 | Wilson | Feb. 8, 1916 |
| 1,262,080 | Midgley | Apr. 9, 1918 |
| 1,318,795 | Nikonow | Oct. 14, 1919 |
| 1,368,635 | Kratz et al. | Feb. 15, 1921 |
| 1,414,653 | Kratz | May 2, 1922 |
| 1,438,728 | Steinhart | Dec. 12, 1922 |
| 1,447,464 | Friedrichs | Mar. 6, 1923 |
| 2,115,671 | Pfisten | Apr. 26, 1938 |

FOREIGN PATENTS

| Number | Country | Date |
| --- | --- | --- |
| 470,823 | Germany | Jan. 30, 1929 |
| 516,395 | France | Dec. 6, 1920 |